United States Patent [19]

Miyamoto et al.

[11] Patent Number: 5,355,195
[45] Date of Patent: Oct. 11, 1994

[54] COPYING MACHINE

[75] Inventors: Mitsugu Miyamoto; Koji Ujino; Hiroyuki Sakamoto, all of Osaka, Japan

[73] Assignee: Mita Industrial Co., Ltd., Osaka, Japan

[21] Appl. No.: 42,530

[22] Filed: Apr. 5, 1993

[30] Foreign Application Priority Data

Apr. 7, 1992 [JP] Japan .................. 4-085773

[51] Int. Cl.5 ............................................. G03B 27/62
[52] U.S. Cl. .................................. 355/75; 355/231
[58] Field of Search .................. 355/75, 76, 230, 231, 355/133

[56] References Cited

U.S. PATENT DOCUMENTS

| 4,010,882 | 3/1977 | Turner ........................... 226/11 |
| 4,124,296 | 11/1978 | Kishi et al. ...................... 355/75 |
| 4,135,805 | 1/1979 | Taylor et al. ................... 355/75 X |
| 4,439,036 | 3/1984 | Davis et al. ..................... 355/75 |
| 4,449,811 | 5/1984 | Betron et al. .................. 355/35 H |
| 4,520,977 | 6/1985 | Holzhauser et al. ............ 248/201 |
| 4,530,598 | 7/1985 | Kajita et al. .................... 355/75 |
| 4,969,010 | 11/1990 | Tamura et al. ................. 355/75 |
| 5,003,347 | 3/1991 | Kameda ......................... 355/75 |
| 5,110,103 | 5/1992 | Miyoshi et al. .................. 271/3 |
| 5,261,634 | 11/1963 | Nakamura ................... 248/441.1 |

FOREIGN PATENT DOCUMENTS 57-49246 3/1982 Japan .
59-141345 9/1984 Japan .
60-42769 3/1985 Japan .

*Primary Examiner*—Richard A. Wintercorn
*Attorney, Agent, or Firm*—Renner, Otto, Boisselle & Sklar

[57] ABSTRACT

A copying machine including a lower body, an upper body, a damper contractively arranged between the upper body and the lower body, and an adjusting member provided in the upper body is disclosed. The lower body end the upper body are rotatably connected with each other at ends thereof and can be opened at the other ends thereof. An original cover and an ADF are selectably mounted on the upper body so as to be replaced with each other. The adjusting member contracts the damper when the ADF is mounted on the upper body.

13 Claims, 1 Drawing Sheet

COPYING MACHINE

BACKGROUND OF THE INVENTION

1. Field of the Invention

The present invention relates to a clamshell type copying machine in which an upper body and a lower body are rotatably connected with each other at ends thereof and can be opened at the other ends thereof.

2. Description of the Related Art

In an electrophotograph copying machine, one of clamshell type copying machines, an upper body and a lower body are rotatably connected with each other via a damper at ends thereof and can be opened at the other ends thereof. The damper reduces the impact generated when the upper body is opened against the lower body, and allows a user to more readily open the upper body readily.

In such a copying machine, an original cover is mounted on an original plate (glass plate) of the upper body so that it can be opened. For the copying operation, the original cover is opened, and then a document to be copied is set on the original plate. Then, the original cover is closed on the original plate so as to hold the document in place.

However, in the case where a number of documents are to be copied with such a copying machine, much manual operation is required in changing and handling the documents. Therefore, an automatic document feeder (ADF) is generally substituted for the original cover so as to automatically feed the documents onto the original plate. In order to use the ADF, the original cover is removed from the upper body of the copying machine. That is, the original cover and the ADF are selectably mounted on the original plate so as to be replaced with each other.

The ADF comprises rollers, gears, a motor and the like for successively feeding the documents onto the original plate, so that the weight of the ADF is much heavier than that of the original cover. As a result, in the case where the ADF. is mounted on the upper body, the damper cannot sufficiently reduce the impact generated when the upper body is opened against the lower body, and much force is required for the opening.

Japanese Laid-Open Utility Model Publication No. 59-141345 and Japanese Laid-Open Patent Publication No. 60-42769 disclose a copying machine in which the position of a damper is adjusted when an ADF is mounted on an upper body of the copying machine so as to tolerate the weight of the ADF. However, this copying machine has a disadvantage in that additional operations are required for adjusting the position of the damper.

Japanese Laid-Open Utility Model Publication No. 57-49246 discloses a copying machine in which the weight of an original cover is increased up to the weight of an ADF so as to balance the former with the latter. However, this copying machine also has a disadvantage in that it is not easy to handle such a heavy original cover.

Furthermore, there is proposed a method in which a damper is replaced with another one when an original cover is replaced with an ADF. However, this method also has a disadvantage in that additional operations are required for replacing the damper with another one.

SUMMARY OF THE INVENTION

The copying machine of this invention comprises a lower body, an upper body, a damper contractively arranged between the upper body and the lower body, and an adjusting member provided in the upper body. The lower body and the upper body are rotatably connected with each other at ends thereof and can be opened at the other ends thereof. An original cover and an ADF are selectably mounted on the upper body so as to be replaced with each other. The adjusting member contracts the damper when the ADF is mounted on the upper body.

Thus, the invention described herein makes possible the advantage of providing a copying machine in which a damper is automatically adjusted in accordance with the weight of an original cover or an ADF, thereby improving efficiency in operation.

This and other advantages of the present invention will become apparent to those skilled in the art upon reading and understanding the following detailed description with reference to the accompanying figures.

DESCRIPTION OF THE PREFERRED EMBODIMENTS

Hereinafter, the present invention will be described by way of illustrating an example referring to FIGS. 1a, 1b, 2, and 3.

Figure 2:
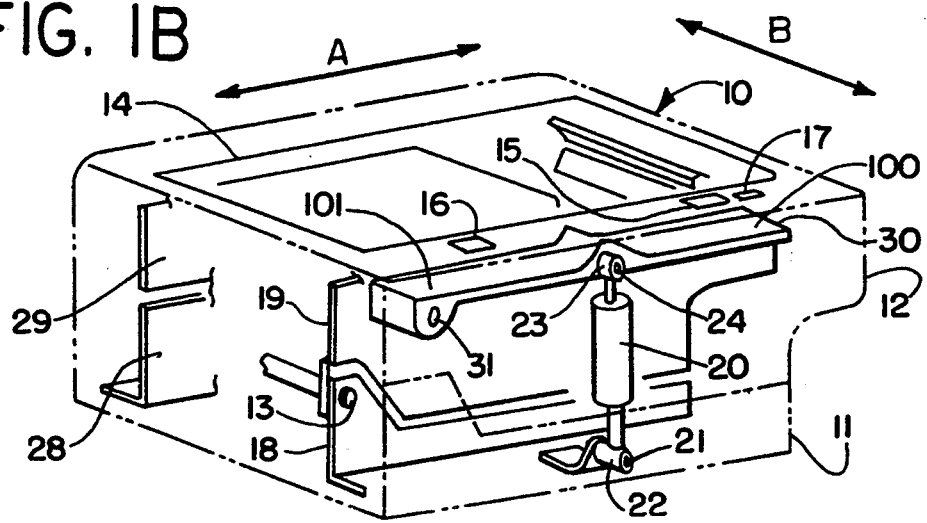
FIG. 2 is a perspective view of the copying machine.

FIG. 2 is a perspective back view of a clamshell type electrograph copying machine according to the present invention. A copying machine body 10 having a rectangular shape comprises a lower body 11 and an upper body 12. The lateral length in a direction A is longer than the longitudinal length in a direction B. The lower body 11 comprises a first lower frame 18 and a second lower frame 28 at a back portion and at a front portion of the copying machine, respectively. The upper body 12 comprises a first upper frame 19 at the back portion of the copying machine and a second upper frame 29 at the front portion of the copying machine. The first and second lower frames 18 and 28 and the first and second upper frames 19 and 29 each have a rectangular shape long in the direction A.

Figure 3:
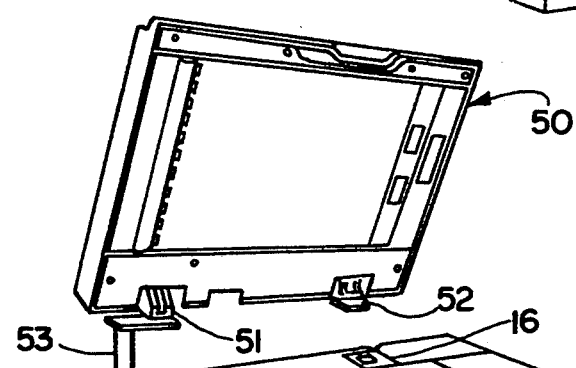
FIG. 3 is a perspective view illustrating how to mount the ADF on the copying machine.

The first lower frame 18 and the first upper frame 19 are rotatably connected with each other at ends in the direction A by a shaft 13. Therefore, the other end of the first upper frame 19 can be moved upward and downward against the other end of the first lower frame 18 centering around the shaft 13. Similarly, ends of the second lower frame 28 and the second upper frame 29 are rotatably connected with each other by the shaft 13, and the other end of the second upper frame 29 can be moved upward and downward against the other end of the second lower frame 28. An original plate 14 made of transparent glass is provided on the top face of the upper body 12. A pair of mounting members 15 and 16 are provided at both ends of the original plate 14, respectively, in the direction A at the back portion of the copying machine. An aperture 17 is provided in the vicinity of the mounting member 15. A press rod 53 of an ADF 50 is inserted into the upper body 12 through the aperture 17 as described later (FIG. 3).

A damper 20 is provided at the back portion of the copying machine body 10, namely, outside the first lower and upper frames 18 and 19. The damper 20 reduces the impact generated when the upper body 12 is opened against the lower body 11, and allows a user to readily open the upper body 12. The damper 20 is provided almost vertically at a center portion of the body 10 in the direction A. A lower connecting sleeve 22 of the damper 20 is rotatably connected to the lower face of the lower body 11 via a pin 21, Above the damper 20, an adjusting member 30 having a flat shape is horizontally provided in the upper body 12 at the back portion of the copying machine. An upper connecting sleeve 23 of the damper 20 is rotatably connected to a central portion of the adjusting member 30 via a pin The adjusting member 30 is provided so as to be in an almost horizontal state. An edge portion 101 of the adjusting member 30 opposite to a free edge portion 100 corresponding to the aperture 17 is rotatably supported by the first upper frame 19 via a pin 31. Thus, the free edge portion 100 of the adjusting member 30 is rotated downward at a prescribed degree from the almost horizontal state, centering around the pin 31.

Figure 1A:
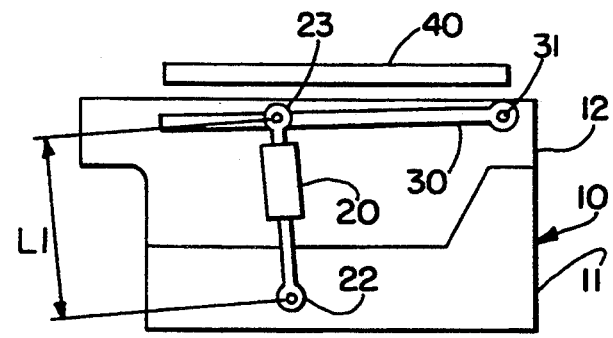
FIG. 1a schematically shows a copying machine of the present invention in a state where an original cover is mounted thereon.

Below will be described the case where the original cover 40 is mounted on the original plate 14 (FIG. 2) as shown in FIG. 1a. The original cover 40 has a pair of hinge members at the back face thereof. The pair of hinge members are mounted onto the pair of mounting members 15 and 16, and thus the original cover 40 is mounted on the original plate 14 so that it can be opened. In this case, the adjusting member 30 is rotated upward centering around the pin 31 so as to be in an almost horizontal state. Therefore, a distance $L_1$ between the lower connecting sleeve 22 and the upper connecting sleeve 23 of the damper 20 becomes the longest, and the damper 20 comes to an almost vertical state. As a result, the damper 20 has a small buffer capacity and impact resilience capacity in accordance with the relatively light weight of the original cover 40.

Figure 1B:
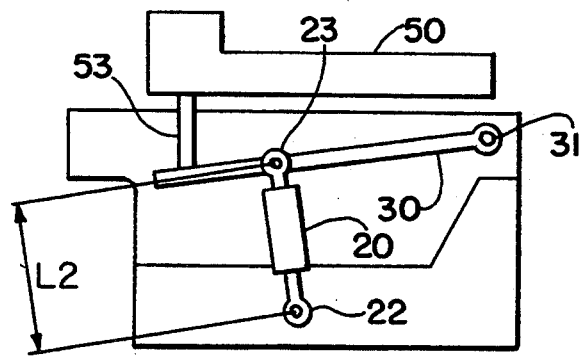
FIG. 1b schematically shows the copying machine in a state where an ADF is mounted thereon.

Next, will be described the case where the ADF 50 is mounted on the original plate 14 as shown in FIG. 1b. As shown in FIG. 3, the ADF 50 has a pair of connecting members 51 and 52 and a press rod 53 at the back face thereof. The pair of connecting members 51 and 52 are mounted onto the pair of mounting members 15 and 16, respectively, and thus the ADF 50 is mounted on the original plate 14. Moreover, the press rod 53 is inserted into the upper body 12 via the aperture 17 so as to press the free edge portion 100 of the adjusting member 30 downward. Thus, the free edge portion 100 is rotated downward centering around the pin 31. In this case, the damper 20 connected to the central portion of the adjusting member 30 via the upper connecting sleeve 23 is contracted. Therefore, a distance $L_2$ between the lower connecting sleeve 22 and the upper connecting sleeve 23 becomes the shortest. As a result, the damper 20 has a large buffer capacity and impact resilience capacity in accordance with the relatively heavy weight of the ADF 50.

As is described above, in the case where the original cover 40 is replaced with the ADF 50, the press rod 53 of the ADF 50 presses the damper 20 via the adjusting member 30. As a result, the damper 20 has sufficient buffer capacity and impact resilience capacity to reduce the impact generated when the upper body 12 is opened against the lower body 11 and allows the user to open the upper body 12 readily.

As the damper to be used in the present invention, a fluid friction type damper or a solid friction type damper can be employed. In the above example, a single press rod is provided in the ADF at the back portion of the copying machine. However, an additional press rod may be provided in the ADF at the front portion of the copying machine. In this case, an additional aperture, damper, and adjusting member are also provided at the front portion of the copying machine.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed

1. A copying machine, comprising:
   a lower body;
   an upper body;
   a damper contractively arranged between the upper body and the lower body; and
   an adjusting member provided in the upper body;
   wherein the lower body and the upper body are rotatably connected with each other at ends thereof and can be opened at the other ends thereof;
   an original cover end an ADF are selectably mounted on the upper body so as to be replaced with each other; and
   the adjusting member contracts the damper when the ADF is mounted on the upper body.

2. A copying machine according to claim 1, wherein the upper body comprises an upper frame at a back portion of the copying machine;
   the lower body comprises a lower frame at the back portion of the copying machine; and
   the upper frame and the lower frame are rotatably connected with each other at ends thereof so that the other end of the upper frame may be moved upward and downward against the other end of the lower frame.

3. A copying machine according to claim 2, wherein the damper is located at the back portion of the copying machine and outside the upper and lower frames.

4. A copying machine according to claim 2, wherein the damper is almost vertically provided at a central portion of the upper and lower frames in a longitudinal direction.

5. A copying machine according to claim 2, wherein the adjusting member is a flat shape, and horizontally provided in the upper frame at the back portion of the copying machine and located above the damper.

6. A copying machine according to claim 2, wherein an aperture is provided at an edge portion of the upper body, in a longitudinal direction, and at the back portion of the copying machine; and
   an edge portion of the adjusting member opposite to a free edge portion corresponding to the aperture is rotatably supported by the upper frame via a pin.

7. A copying machine according to claim 6, wherein the free edge portion of the adjusting member is rotated downward at a prescribed degree from an almost horizontal state.

8. A copying machine according to claim 1, wherein the damper has an upper connecting portion and a lower connecting portion;
   the upper connecting portion is rotatably connected to the central portion of the adjusting member via a pin; and
   the lower connecting portion is rotatably connected to the lower face of the lower body via a pin.

9. A copying machine according to claim 6, wherein the ADF comprises a press rod at an edge portion thereof in a longitudinal direction; and
   the press rod presses the free edge portion of the adjusting member downward so as to contract the damper.

10. A copying machine according to claim 8, wherein a distance between the upper connecting portion and the lower connecting portion of the damper becomes longest when the original cover is mounted on the upper body.

11. A copying machine according to claim 1, wherein the damper and the adjusting member are provided at the back portion of the copying machine; and
   an additional damper and an additional adjusting member are further provided at the front portion of the copying machine.

12. A copying machine according to claim 1, wherein the upper body comprises an upper frame at a front portion of the copying machine;
   the lower body comprises a lower frame at the front portion of the copying machine; and
   the upper frame and the lower frame are rotatably connected with each other at ends thereof so that the other end of The upper frame may be moved upward and downward against the other end of the lower frame.

13. A copying machine according to claim 2, wherein the upper body further comprises an additional upper frame at a front portion of the copying machine;
   the lower body further comprises an additional lower frame at the front portion of the copying machine; and
   the additional upper frame and the additional lower frame are rotatably connected with each other at ends thereof so that the other end of the additional upper frame may be moved upward and downward against the other end of the additional lower frame.

* * * * *

UNITED STATES PATENT AND TRADEMARK OFFICE
CERTIFICATE OF CORRECTION

PATENT NO. : 5,355,195
DATED : October 11, 1994
INVENTOR(S) : Mitsugu Miyamoto et al.

It is certified that error appears in the above-identified patent and that said Letters Patent is hereby corrected as shown below:

Column 3, line 20, after "pin" insert --24--.

IN THE CLAIMS:

Claim 12, column 6, line 11, change "The" to --the--.

Signed and Sealed this

Sixth Day of June, 1995

Attest:

BRUCE LEHMAN

*Attesting Officer*    *Commissioner of Patents and Trademarks*